(12) United States Patent
Yae

(10) Patent No.: US 12,444,416 B2
(45) Date of Patent: Oct. 14, 2025

(54) VEHICLE AND CONTROL METHOD THEREOF

(71) Applicants: HYUNDAI MOTOR COMPANY, Seoul (KR); KIA CORPORATION, Seoul (KR)

(72) Inventor: Seong Soo Yae, Hwaseong-si (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 277 days.

(21) Appl. No.: 18/070,688

(22) Filed: Nov. 29, 2022

(65) Prior Publication Data

US 2023/0197076 A1   Jun. 22, 2023

(30) Foreign Application Priority Data

Dec. 17, 2021 (KR) .................. 10-2021-0181322

(51) Int. Cl.
*G10L 15/22* (2006.01)
*B60R 11/02* (2006.01)
*B60R 16/037* (2006.01)
*H04R 1/40* (2006.01)
*B60R 11/00* (2006.01)

(52) U.S. Cl.
CPC .......... *G10L 15/22* (2013.01); *B60R 11/0217* (2013.01); *B60R 16/0373* (2013.01); *H04R 1/406* (2013.01); *B60R 2011/0012* (2013.01); *G10L 2015/223* (2013.01)

(58) Field of Classification Search
None
See application file for complete search history.

(56) References Cited

U.S. PATENT DOCUMENTS

| 6,397,136 | B1* | 5/2002 | Breed ................. | B60R 21/0152 |
| | | | | 701/45 |
| 11,193,312 | B1* | 12/2021 | Weng ..................... | B60R 25/01 |
| 2004/0170289 | A1* | 9/2004 | Whan ..................... | H04M 3/56 |
| | | | | 379/202.01 |
| 2005/0249360 | A1* | 11/2005 | Adcock ................. | H04R 3/005 |
| | | | | 381/92 |
| 2006/0062398 | A1* | 3/2006 | McKee Cooper ....... | H04R 5/04 |
| | | | | 381/59 |

(Continued)

*Primary Examiner* — Jakieda R Jackson
(74) *Attorney, Agent, or Firm* — Lempia Summerfield Katz LLC

(57) ABSTRACT

A vehicle may accurately recognize a voice command of a speaker by identifying the speaker who desires to use a voice recognition function. In particular, the vehicle includes: a microphone array including a first microphone and a second microphone; a button configured to activate a voice recognition system; a sensor configured to detect a contact area of a finger pressing the button. The voice recognition system is configured to: determine a location of a speaker who presses the button based on the contact area; select the first microphone and the second microphone as a main microphone and an auxiliary microphone, respectively, based on a determination that the speaker is located in a first seat; and select the second microphone and the first microphone as the main microphone and the auxiliary microphone, respectively, based on a determination that the speaker is located in a second seat.

18 Claims, 9 Drawing Sheets

(56) References Cited

U.S. PATENT DOCUMENTS

| | | | |
|---|---|---|---|
| 2009/0289780 A1* | 11/2009 | Tenorio-Fox | B60R 25/04 280/727 |
| 2010/0226539 A1* | 9/2010 | Ishii | G06F 3/0425 382/104 |
| 2010/0241309 A1* | 9/2010 | Demirdjian | B60R 21/015 701/45 |
| 2012/0051548 A1* | 3/2012 | Visser | H04R 3/005 381/56 |
| 2012/0116774 A1* | 5/2012 | Forsell | A61N 1/37217 704/E15.004 |
| 2012/0284023 A1* | 11/2012 | Vitte | H04M 9/082 704/E15.039 |
| 2013/0030801 A1* | 1/2013 | Fallat | H04R 3/005 704/226 |
| 2013/0109342 A1* | 5/2013 | Welch | G08B 21/22 455/404.2 |
| 2013/0328391 A1* | 12/2013 | Jerusalem | B60K 35/10 307/10.1 |
| 2015/0206181 A1* | 7/2015 | Parundekar | G06Q 30/0261 705/14.49 |
| 2015/0364136 A1* | 12/2015 | Katuri | G10L 15/30 704/233 |
| 2016/0009317 A1* | 1/2016 | Evreinov | B62D 1/06 340/407.1 |
| 2016/0029111 A1* | 1/2016 | Wacquant | H04R 3/005 381/86 |
| 2016/0299617 A1* | 10/2016 | Hanson | B60K 37/00 |
| 2017/0103592 A1* | 4/2017 | Buttolo | G07C 9/21 |
| 2017/0116983 A1* | 4/2017 | Furukawa | G10L 15/20 |
| 2017/0195768 A1* | 7/2017 | Kim | H04R 1/08 |
| 2017/0308352 A1* | 10/2017 | Kessler | H04R 3/005 |
| 2018/0190282 A1* | 7/2018 | Mohammad | G10K 11/178 |
| 2018/0255418 A1* | 9/2018 | Tzirkel-Hancock | H04S 7/305 |
| 2018/0350357 A1* | 12/2018 | Pandey | G10L 15/20 |
| 2019/0108837 A1* | 4/2019 | Christoph | G10L 15/30 |
| 2020/0075006 A1* | 3/2020 | Chen | G10L 15/22 |
| 2020/0154220 A1* | 5/2020 | Wacquant | H04R 27/00 |
| 2020/0184986 A1* | 6/2020 | Parada | G10L 17/06 |
| 2021/0035571 A1* | 2/2021 | Yun | G10L 15/08 |
| 2021/0094492 A1* | 4/2021 | Zender | G06V 40/70 |
| 2021/0125625 A1* | 4/2021 | Huang | G10L 25/21 |
| 2021/0219074 A1* | 7/2021 | Zhang | G10K 11/175 |
| 2021/0245650 A1* | 8/2021 | Tomioka | A61G 3/061 |
| 2021/0266992 A1* | 8/2021 | Kim | H04M 15/49 |
| 2021/0323406 A1* | 10/2021 | So | B60K 35/00 |
| 2021/0334562 A1* | 10/2021 | Park | B60R 21/015 |
| 2021/0374412 A1* | 12/2021 | Cerri | G06T 7/90 |
| 2022/0014617 A1* | 1/2022 | Jin | H04M 1/6008 |
| 2022/0046358 A1* | 2/2022 | Tachi | H04R 3/04 |
| 2022/0135060 A1* | 5/2022 | Singh | B60K 35/50 701/1 |

* cited by examiner

FIG. 4
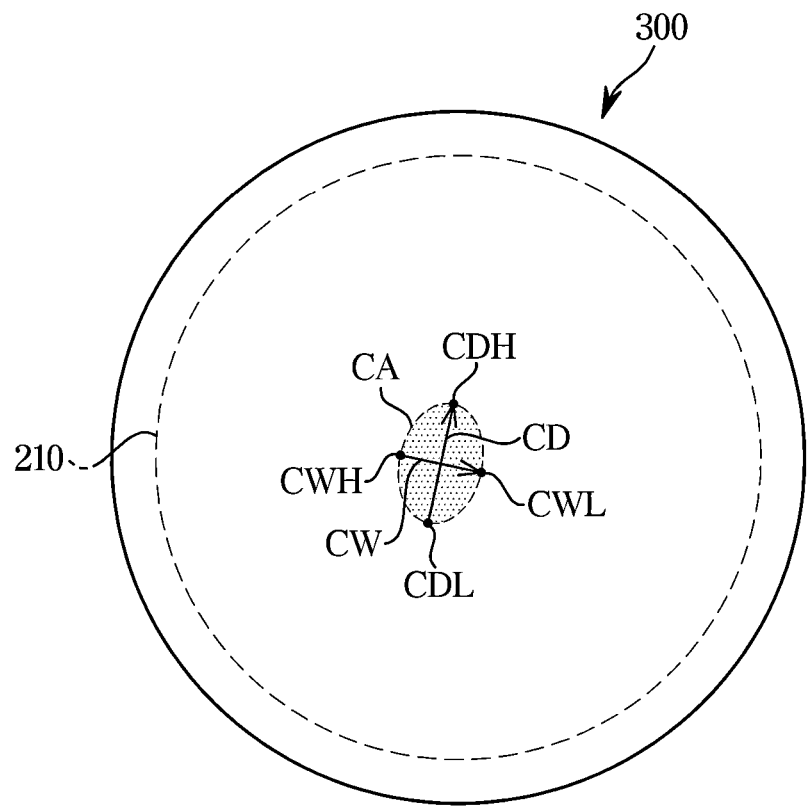
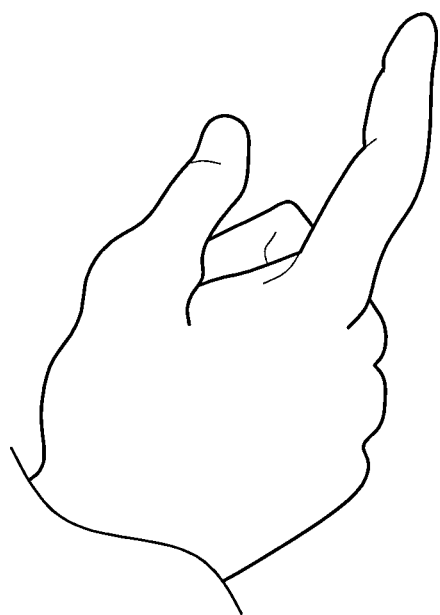

FIG. 5
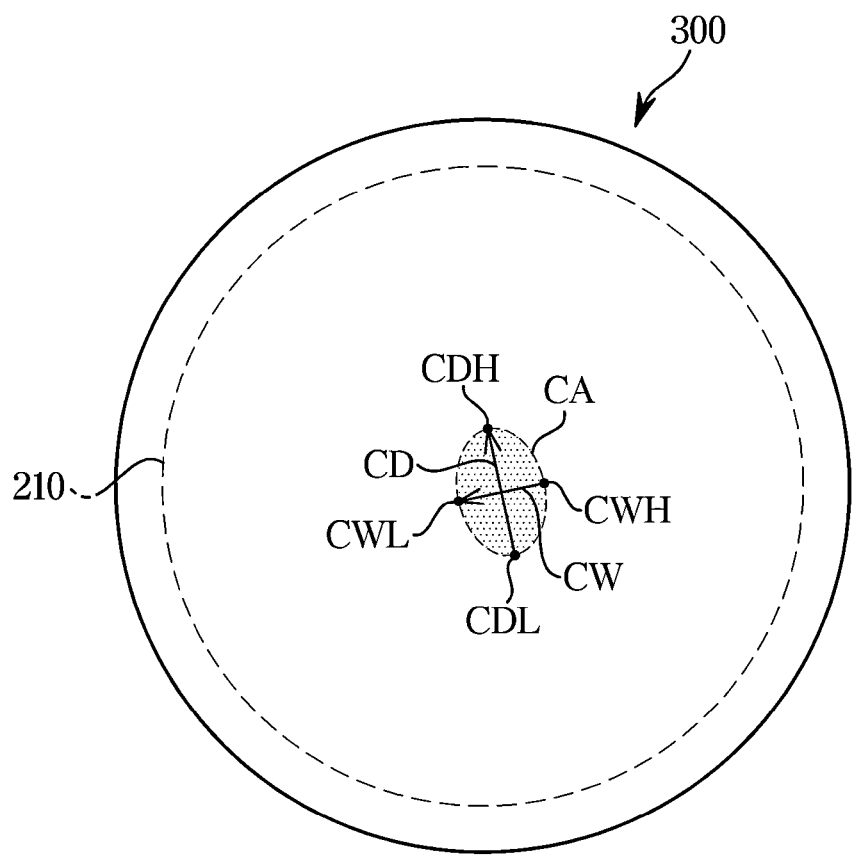
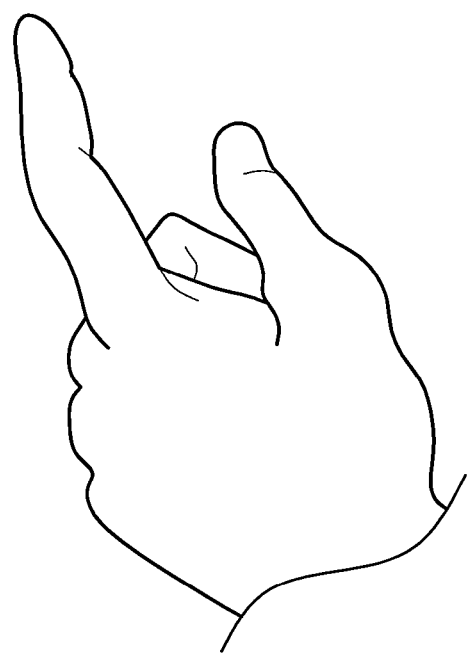

FIG. 8

| DETECTION RESULT OF CONTACT AREA | DETECTION RESULT OF WEIGHT CHANGE | LOCATION OF SPEAKER | MODE |
|---|---|---|---|
| LS | LS | LS | A |
| LS | RS | - | C |
| RS | LS | - | C |
| RS | RS | RS | B |
| LS | - | LS | A |
| RS | - | RS | B |
| - | LS | LS | A |
| - | RS | RS | B |
| - | - | - | C |

VEHICLE AND CONTROL METHOD THEREOF

CROSS-REFERENCE TO RELATED APPLICATION

This application claims under 35 U.S.C. § 119 priority to Korean Patent Application No. 10-2021-0181322, filed on Dec. 17, 2021 in the Korean Intellectual Property Office, the disclosure of which is incorporated herein by reference.

BACKGROUND

1. Technical Field

The present disclosure relates to a vehicle and a control method thereof that may conveniently control various functions of the vehicle through a voice command.

2. Background Art

A voice recognition system is capable of recognizing a user's speech and providing a service corresponding to the recognized speech.

Recently, a variety of services using the voice recognition system are provided, and in particular, when an occupant in a vehicle says a command for controlling a function of the vehicle, the corresponding function may be controlled according to an occupant's intention.

Since a vehicle is equipped with a variety of functions, an occupant may control the various functions through a speech command including a control object and a control command for the control object.

In order to accurately recognize speeches of occupants in a vehicle, microphones for each seat are required to be mounted. However, the increased number of microphones may lead to a rise in costs.

SUMMARY

The present disclosure provides a vehicle and a control method thereof that may accurately recognize a voice command of a speaker by identifying the speaker who desires to use a speech recognition function.

Additional aspects of the present disclosure should be set forth in part in the following description and, in part, should be obvious from the description, or may be learned by practice of the disclosure.

According to an embodiment of the disclosure, a vehicle includes: a microphone array including a first microphone and a second microphone; a voice recognition system configured to be activated by a button; a sensor configured to detect a contact area of a finger pressing the button. The voice recognition system is configured to: determine a location of a speaker who presses the button based on the contact area, select the first microphone and the second microphone as a main microphone and an auxiliary microphone, respectively, based on a determination that the speaker is located in a first seat, and select the second microphone and the first microphone as the main microphone and the auxiliary microphone, respectively, based on a determination that the speaker is located in a second seat.

In another embodiment, the voice recognition system is configured to receive main audio data from the main microphone, receive auxiliary audio data from the auxiliary microphone, remove a noise signal included in the main audio data based on the auxiliary audio data, and identify a voice command of the speaker based on the main audio data from which the noise signal is removed.

In particular, a distance between the first microphone and the first seat is shorter than a distance between the second microphone and the first seat, and a distance between the second microphone and the second seat is shorter than a distance between the first microphone and the second seat.

In another embodiment, the voice recognition system is configured to determine a contact direction of the finger based on the contact area, determine that the speaker is located in the first seat based on a determination that the contact direction is a first direction, and determine that the speaker is located in the second seat based on a determination that the contact direction is a second direction.

In one embodiment, the first direction is toward the second seat, and the second direction is toward the first seat.

In another embodiment, the voice recognition system is configured to select the first microphone and the second microphone as the main microphone, based on the location of the speaker not being determined.

In another embodiment, the vehicle further includes: a first weight sensor configured to detect a weight of a first occupant sitting in the first seat; and a second weight sensor configured to detect a weight of a second occupant sitting in the second seat. In particular, the voice recognition system is configured to: estimate a location of the speaker based on the contact area, estimate a location of the speaker based on the weight of the first occupant and the weight of the second occupant, and determine the location of the speaker, based on the location of the speaker estimated based on the contact area being identical to the location of the speaker estimated based on the weight of the first occupant and the weight of the second occupant.

In another embodiment, the voice recognition system is configured to determine the location of the speaker as the first seat based on a history where the weight of the first occupant is changed by a preset value for a preset period of time before the button is pressed being existent and a history where the weight of the second occupant is changed by the preset value for the preset period of time before the button is pressed being non-existent.

In another embodiment, the voice recognition system is configured to determine, as the location of the speaker, the location of the speaker estimated based on the contact area, when a history where the weight of the first occupant and the weight of the second occupant are changed by a preset value for a preset period of time before the button is pressed is non-existent.

In another embodiment, the voice recognition system is configured to determine the first microphone and the second microphone as the main microphone, based on the location of the speaker estimated based on the contact area being different from the location of the speaker estimated based on the weight of the first occupant and the weight of the second occupant.

According to another embodiment of the present disclosure, there is provided a control method of a vehicle including: a microphone array including a first microphone and a second microphone, a button configured to activate a voice recognition system, and a sensor configured to detect a contact area of a finger pressing the button. The control method includes: determining a location of a speaker who presses the button based on the contact area, selecting the first microphone and the second microphone as a main microphone and an auxiliary microphone, respectively, based on a determination that the speaker is located in a first seat, and selecting the second microphone and the first microphone as the main microphone and the auxiliary microphone, respectively, based on a determination that the speaker is located in a second seat.

In another embodiment, the control method of the vehicle further includes: receiving main audio data from the main microphone; receiving auxiliary audio data from the auxiliary microphone; removing a noise signal included in the main audio data based on the auxiliary audio data; and identifying a voice command of the speaker based on the main audio data from which the noise signal is removed.

In one embodiment, a distance between the first microphone and the first seat is shorter than a distance between the second microphone and the first seat, and a distance between the second microphone and the second seat is shorter than a distance between the first microphone and the second seat.

In one embodiment, determining the location of the speaker includes: determining a contact direction of the finger based on the contact area; determining that the speaker is located in the first seat based on a determination that the contact direction is a first direction; and determining that the speaker is located in the second seat based on a determination that the contact direction is a second direction.

In one embodiment, the first direction is toward the second seat, and the second direction is toward the first seat.

In one embodiment, the control method of the vehicle further includes: selecting the first microphone and the second microphone as the main microphone based on the location of the speaker not being determined.

In one embodiment, determining the location of the speaker includes: estimating a location of the speaker based on the contact area; estimating a location of the speaker based on a weight of a first occupant sitting in the first seat and a weight of a second occupant sitting in the second seat; and determining the location of the speaker based on the location of the speaker estimated based on the contact area being identical to the location of the speaker estimated based on the weight of the first occupant and the weight of the second occupant.

In one embodiment, estimating the location of the speaker based on the weight of the first occupant and the weight of the second occupant includes: determining the location of the speaker as the first seat, based on a history where the weight of the first occupant is changed by a preset value for a preset period of time before the button is pressed being existent and a history where the weight of the second occupant is changed by the preset value for the preset period of time before the button is pressed being non-existent.

In one embodiment, determining the location of the speaker includes: determining, as the location of the speaker, the location of the speaker estimated based on the contact area, when a history where the weight of the first occupant and the weight of the second occupant are changed by a preset value for a preset period of time before the button is pressed is non-existent.

In one embodiment, the control method of the vehicle further includes: determining the first microphone and the second microphone as the main microphone, based on the location of the speaker estimated based on the contact area being different from the location of the speaker estimated based on the weight of the first occupant and the weight of the second occupant.

BRIEF DESCRIPTION OF THE DRAWINGS

These and/or other aspects of the disclosure should become apparent and more readily appreciated from the following description of the embodiments, taken in conjunction with the accompanying drawings of which:

FIG. 4 illustrates a contact area when an occupant in a left seat presses a start button;

FIG. 5 illustrates a contact area when an occupant in a right seat presses a start button;

FIG. 8 illustrates a table for describing a criterion for identifying a location of a speaker according to a detection result of a contact area and a detection result of a weight change.

DETAILED DESCRIPTION

Figure 1:
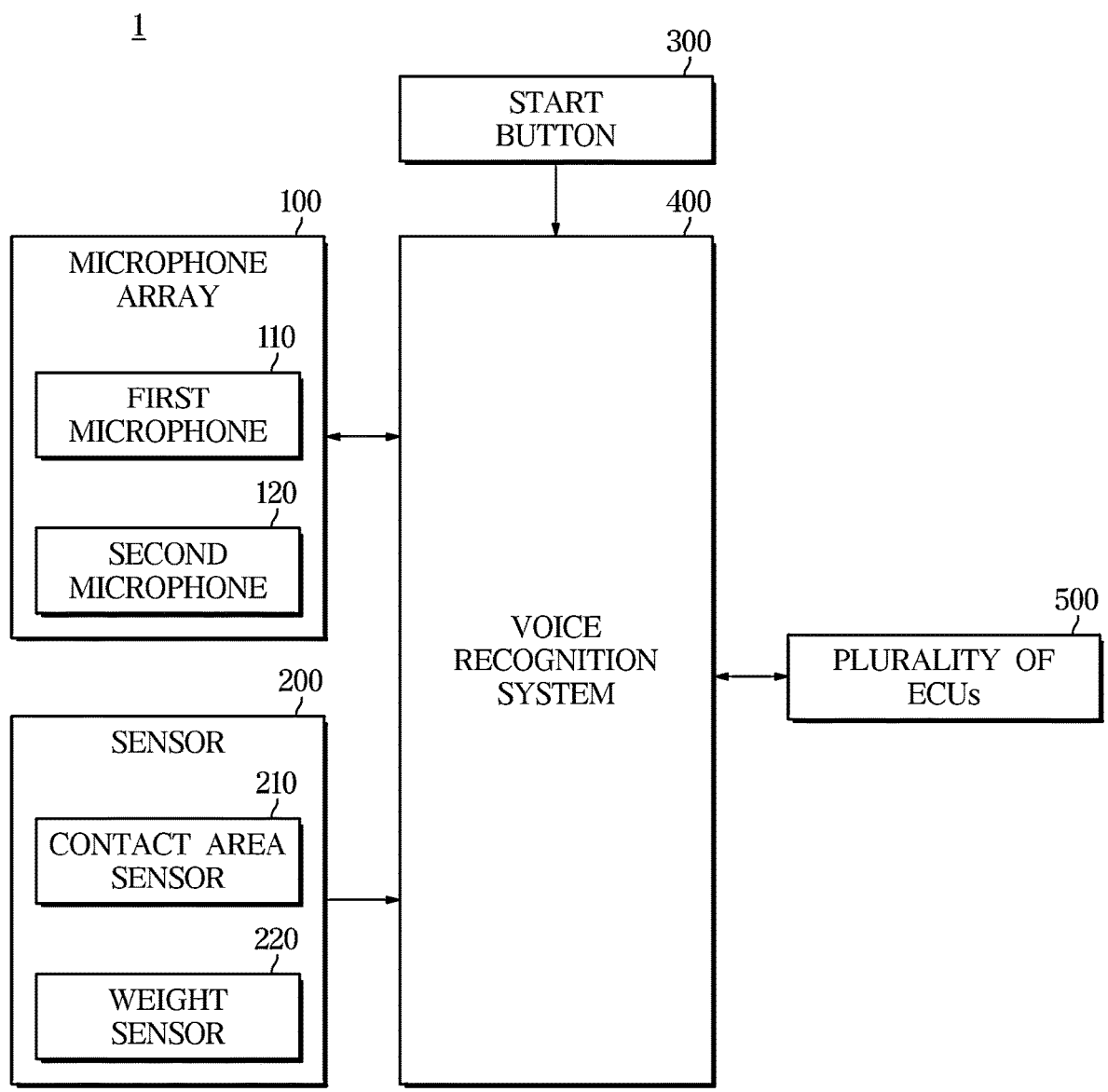
FIG. 1 is a block diagram illustrating a configuration of a vehicle according to an embodiment.

Advantages and features of embodiments, and methods of achieving the same should be clearly understood with reference to the accompanying drawings and the following detailed embodiments. However, the present inventive concept is not limited to embodiments described herein, but may be implemented in various different forms. Embodiments are provided in order to explain the present inventive concept for those having ordinary skill in the art.

The terms used herein are briefly described and embodiments are described in detail below.

Although the terms used herein are selected from among general terms that are currently and widely used in consideration of functions in embodiments, these may be changed according to intentions or customs of those skilled in the art or the advent of new technology. In addition, in a specific case, some terms may be arbitrarily selected by applicants. In this case, meanings thereof are described in a corresponding description of embodiments. Therefore, the meanings of terms used herein should be interpreted based on substantial meanings of the terms and content of this entire specification, rather than simply the terms themselves.

Throughout this specification, when a certain part "includes" a certain component, it means that another component may be further included not excluding another component, unless otherwise defined. Moreover, terms described in the specification such as "part," "module," and "unit," refer to a unit of processing at least one function or operation, and may be implemented by software, a hardware component such as a field-programmable gate array (FPGA) or an application-specific integrated circuit (ASIC), or a combination of software and hardware. However, the terms "part," "module," "unit," and the like are not limited to software or hardware. "Part," "module," "unit," and the like may be configured in a recording medium that may be addressed or may be configured to be reproduced on at least one processor. Therefore, examples of the terms "part," "module," "unit," and the like include software components, object-oriented software components, components such as class components and task components, processes, functions, properties, procedures, subroutines, segments in program codes, drivers, firmware, microcode, circuits, data, databases, data structures, tables, arrays, and variables. The components and the modules may be provided into smaller number of components and modules such that the respective component and modules may be merged in respect to the functionality.

Reference numerals used for method stages are just used for convenience of explanation, but not to limit an order of the stages. Thus, unless the context clearly dictates otherwise, the written order may be practiced otherwise.

When a component, device, element, or the like of the present disclosure is described as having a purpose or performing an operation, function, or the like, the component, device, or element should be considered herein as being "configured to" meet that purpose or to perform that operation or function.

Hereinafter, with reference to the accompanying drawings, embodiments of a vehicle and a control method thereof are described in detail so that a person or ordinary skilled in the art can easily implement the disclosure. In addition, parts irrelevant to description are omitted in the drawings in order to clearly explain exemplary embodiments. In the accompanying drawings, parts that are identical or equivalent to each other are assigned the same reference numerals, and in the following description of the embodiments, details of redundant descriptions thereof have been omitted.

Figure 2:
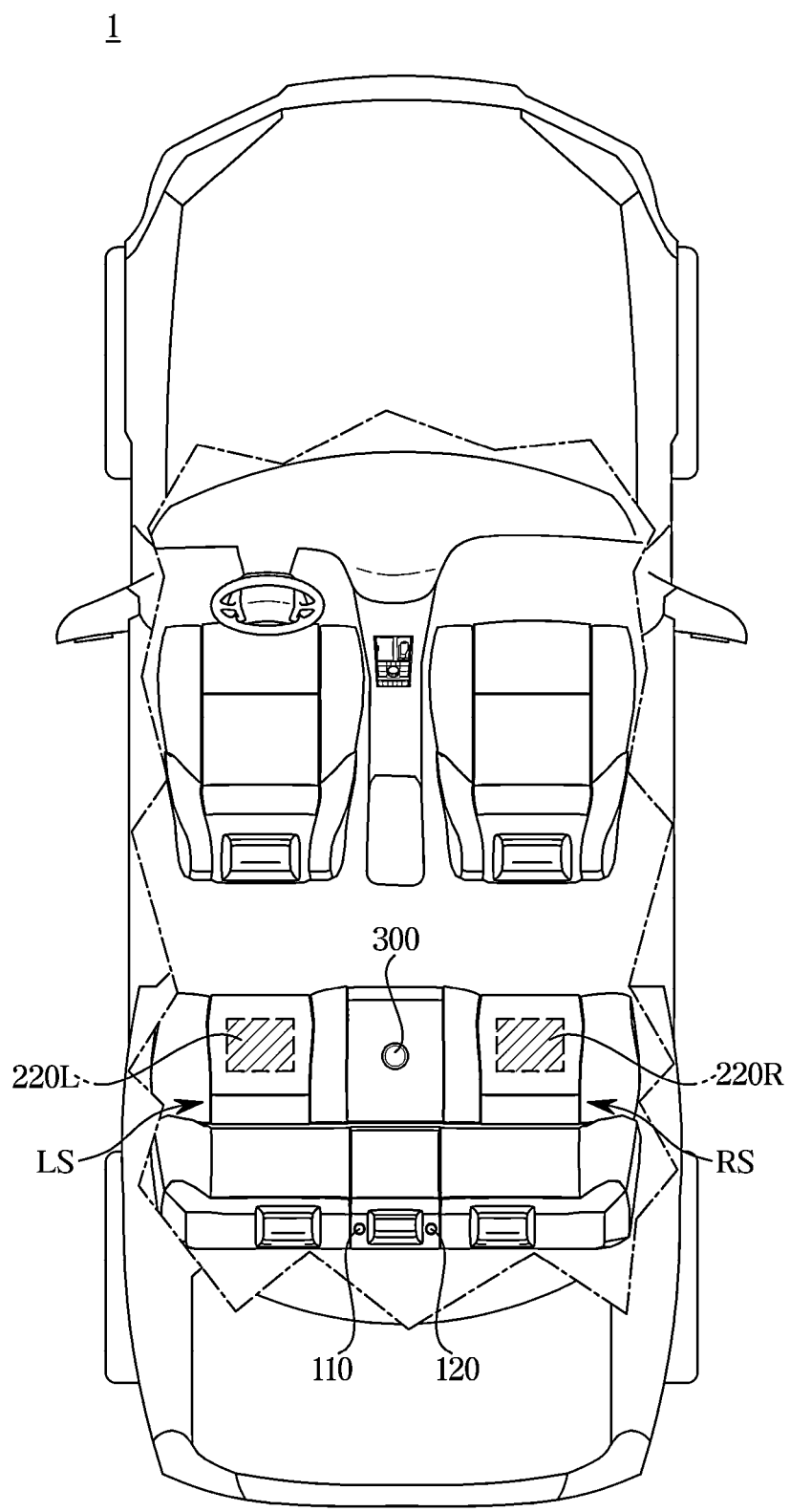
FIG. 2 is a diagram illustrating a portion of an interior of a vehicle according to an embodiment.

FIG. 1 is a block diagram illustrating a configuration of a vehicle according to an embodiment. FIG. 2 is a diagram illustrating a portion of an interior of a vehicle according to an embodiment.

Referring to FIG. 1, a vehicle 1 according to an embodiment may include a microphone array 100, a sensor 200, a start button 300, a voice recognition system 400 and a plurality of electronic control units (ECU) 500.

The microphone array 100 may include a plurality of microphones (e.g., a first microphone and a second microphone 120).

The microphone array 100 may receive an audio input and generate an electrical signal corresponding to the audio input.

The microphone array 100 may be disposed inside the vehicle 1 to receive a voice of a user located inside the vehicle 1 and the plurality of microphones 110 and 120 may be disposed in an array form.

The plurality of microphones 110 and 120 may convert the audio input of the user (e.g., voice) into an electrical signal and transmit the electrical signal to the voice recognition system 400.

According to various embodiments, at least one microphone (e.g., the first microphone 110 and/or the second microphone 120) of the plurality of microphones may be used as a main microphone for collecting main audio data (e.g., a voice signal corresponding to the user's voice), and also at least one microphone (e.g., the first microphone 110 or the second microphone 120) of the plurality of microphones may be used as an auxiliary microphone for collecting auxiliary audio data (e.g., a noise signal).

According to an embodiment, the first microphone 110 and the second microphone 120 may be disposed adjacent to a rear seat for collecting a voice of an occupant sitting in the rear seat.

In another embodiment, the first microphone 110 may be provided adjacent to a first seat (e.g., a rear left seat) and the second microphone 120 may be provided adjacent to a second seat (e.g., a rear right seat).

In other words, a distance between the first microphone 110 and the first seat may be shorter than a distance between the second microphone 120 and the first seat, and a distance between the second microphone 120 and the second seat may be shorter than a distance between the first microphone 110 and the second seat.

Hereinafter, for convenience of description, it is assumed that the first seat "LS" corresponds to the rear left seat, and the second seat "RS" corresponds to the rear right seat, without being limited thereto. For example, the first seat LS may refer to a driver's seat and the second seat RS may refer to an occupant seat located next to the driver's seat.

In other words, the first seat LS and the second seat RS may refer to seats arranged in a direction perpendicular to a heading direction of the vehicle 1.

Referring to FIG. 2, the first microphone 110 may be mounted adjacent to the first seat LS and the second microphone 120 may be mounted adjacent to the second seat RS.

However, a position of the microphone array 100 is not limited to the position shown in FIG. 2, and the microphone array 100 may be disposed anywhere as long as it may receive a voice of a rear seat occupant.

The microphone array 100 may be activated based on a preset condition satisfied. For example, the microphone array 100 may be activated based on receiving a wake-up signal from the voice recognition system 400.

The audio data collected from the microphone array 100 may be pre-processed and transmitted to the voice recognition system 400, or may be transmitted to the voice recognition system 400 without pre-processing.

According to various embodiments, first audio data collected from the first microphone 110 and second audio data collected from the second microphone 120 may be transmitted to different front-end modules. For example, the first audio data may be transmitted to a first front-end module of the voice recognition system 400 and the second audio data may be transmitted to a second front-end module of the voice recognition system 400.

Accordingly, the voice recognition system 400 may process the first audio data and the second audio data, respectively.

The sensor 200 may include at least one sensor that obtains information for identifying a location of a speaker.

In one embodiment, the sensor 200 may include a contact area sensor 210 detecting a contact area of a finger which presses the start button 300. The contact area sensor 210 may be provided in the start button 300 to detect the contact area of the finger which presses the start button 300.

The contact area sensor 210 may be implemented as any type of sensor capable of detecting the finger's contact area. For example, the contact area sensor 210 may include a capacitive sensor for detecting a capacitance value varying according to a finger's contact and/or an ultrasonic sensor for detecting the finger's contact area by irradiating ultrasonic waves and/or a pressure sensor for detecting a pressure varying according to a finger's contact.

The contact area sensor 210 may transmit information about the contact area to the voice recognition system 400.

In another embodiment, the sensor 200 may include a weight sensor 220 that detects a weight of an occupant sitting in the first seat LS and/or the second seat RS.

The weight sensor 220 may include a first weight sensor 220L that detects a weight of an occupant (hereinafter, 'first occupant') sitting in the first seat LS and/or a second weight sensor 220R that detects a weight of an occupant (hereinafter, 'second occupant') sitting in the second seat RS.

The weight sensor 220 may be implemented as any type of sensor capable of detecting a weight of an occupant (or package) sitting in the first seat LS and/or the second seat RS. For example, the weight sensor 220 may include a pressure sensor that detects a pressure applied to the first seat LS and/or the second seat RS.

The weight sensor 220 may obtain information about the weight of the first occupant and/or information about the weight of the second occupant, and transmit the information about the weight of the first occupant and/or the information about the weight of the second occupant to the voice recognition system 400.

The start button 300 is for activating a voice recognition function, and a user may activate the voice recognition system 400 by pressing the start button 300.

The start button 300 may be implemented as a push switch which is shorted or open by pushing to generate an electrical signal, and/or a touchpad capable of generating an electrical signal by a touch input. However, the start button 300 is not limited to the push switch and/or touchpad, and may be of any types, as long as it is capable of generating an electrical signal by a user's physical contact.

The voice recognition system 400 may be activated based on receiving an electrical signal from the start button 300.

According to various embodiments, the voice recognition system 400 may be activated in a state where the start button 300 is being pressed, and be activated for a preset period of time after the start button 300 is pressed.

The start button 300 may be disposed at a location where the first occupant's hand and the second occupant's hand may easily reach, for example, a location between the first seat LS and the second seat RS.

The voice recognition system 400 may transmit, to the microphone array 100, a wake-up signal for activating the microphone array 100, based on receiving the electrical signal generated by pressing by the user from the start button 300.

According to an embodiment, the voice recognition system 400 and/or the microphone array 100 may be activated only when a preset condition is satisfied, thereby saving power consumption.

The voice recognition system 400 may determine a speaker's intention by processing the audio data collected from the microphone array 100, and control a function of the vehicle 1 corresponding to the speaker's intention.

According to an embodiment, the voice recognition system 400 may include an audio processor for processing the audio data.

The speech processor may include a speech to text (STT) engine converting the audio data input through the microphone array 100 to text information, and a dialogue manager analyzing text to determine a user's intention included in an utterance command.

The dialogue manager may understand the user's intention corresponding to the audio data by applying a natural language understanding technology to text.

Specifically, the dialogue manger performs morphological analysis with respect to an utterance command in text form, and converts an input character string into a morpheme sequence. Also, the dialogue manger may identify an entity name from the utterance command. The entity name is a proper noun such as names of an individual person, place and organization, time, day, currency, terms indicating a family relationship, terms of various electronic devices of the vehicle 1, and the like. Named entity recognition is for identifying an entity name in a sentence and determining a type of the identified entity name. The dialogue manger may extract a keyword from the sentence through the named entity recognition to understand a meaning of the sentence.

Also, the dialogue manger may recognize a domain from the utterance command of the user. A domain is for identifying a subject of the user's utterance. For example, types of the plurality of ECUs 500 which are a control object may be the domain. Accordingly, electronics of the vehicle 1, such as a navigation device control unit, window control unit, ventilated seat control unit, radio control unit, sunroof control unit, cruise function control unit, air conditioner control unit, etc., may be a domain.

In addition, the dialogue manger may recognize a control command from the audio data. The control command is for identifying a purpose of the user's speech, and may include a control command for a control object.

In one embodiment, the control command may include an ON/OFF command, a function setting command, etc. The ON/OFF command is a command for activating or deactivating a specific function, and the function setting command may include a command for setting details of a specific function.

In one embodiment, the function setting command may include a 'command to open a control object (e.g., the window control unit)', a 'command to change a set temperature of a control object (e.g., the air conditioner control unit) to a specific temperature', a 'command to change a set speed of a control object (e.g., the cruise function control unit) to a specific speed', a 'command to change a frequency of a control object (e.g., the radio control unit) to a specific frequency', a 'command to change a level of a control object (e.g., the ventilated seat control unit) to a specific intensity', a 'command to change a mode of a control object (e.g., the air conditioner control unit)', and the like.

As such, the dialogue manger may understand the user's intention based on information such as the control command, the entity name, the domain corresponding to the user's utterance command and extract an action corresponding to the user's intention.

For instance, when an 'air conditioner' is determined as a control object and 'operation' is determined as a control command, an action corresponding to the control object and control command may be defined as 'air-conditioner(object)_ON(operator)'. Also, when a 'window' is determined as a control object and 'open' is determined as a control command, an action corresponding to the control object and control command may be defined as 'window(object)_OPEN(operator)'.

According to various embodiments, the voice recognition system 400 may use the audio data, collected from one of the first microphone 110 or the second microphone 120, as audio data for noise reduction function, and also use the audio data, collected from one of the first microphone 110 or the second microphone 120, as audio data for identifying the user's utterance command.

When the first microphone 110 is selected as the main microphone and the second microphone 120 is selected as the auxiliary microphone, the voice recognition system 400 may remove a noise signal included in the first audio data based on the second audio data collected from the second microphone 120, and the voice recognition system 400 may identify the speaker's utterance command based on the first audio data from which the noise signal is removed.

According to an embodiment, the voice recognition system 400 may receive a voice signal of the user through the main microphone and a noise signal inside the vehicle 1 through the auxiliary microphone. Also, the voice recognition system 400 may generate a noise pattern based on the noise signal input through the auxiliary microphone and compare the noise pattern with the voice signal received through the main microphone, thereby the voice recognition system 400 may reduce a noise in the voice signal.

In one embodiment, the voice recognition system 400 may form directivity in the main microphone by using a time delay between the main audio data received through the main microphone and auxiliary audio data received through the auxiliary microphone.

In addition, the voice recognition system 400 may selectively adjust gain of the first microphone 110 and the second microphone 120. For instance, when the first microphone 110 is selected as the main microphone and the second microphone 120 is selected as the auxiliary microphone, the voice recognition system 400 may set a gain of the first microphone 110 to be higher than a gain of the second microphone 120.

The voice recognition system 400 may use one of the first microphone 110 or the second microphone 120 as the auxiliary microphone and adjust a gain, thereby adjusting a beamforming area.

For example, by using the first microphone 110 as the main microphone and the second microphone 120 as the auxiliary microphone, the voice recognition system 400 may accurately recognize a voice command of the first occupant. Also, by using the second microphone 120 as the main microphone and the first microphone 110 as the auxiliary microphone, the voice recognition system 400 may accurately recognize a voice command of the second occupant.

An algorithm for implementing a beamforming method and/or noise reduction method using the first microphone 110 or the second microphone 120 may be employed without limitation within a general technical scope.

The voice recognition system 400 may transmit a control signal to the plurality of ECUs 500 based on processing the first audio data and the second audio data.

For instance, when the speaker's voice command is intended to turn on the air conditioner, the voice recognition system 400 may transmit a control signal for turning on the air conditioner to the air conditioner control unit of the plurality of ECUs 500.

In other words, the voice recognition system 400 may control the plurality of ECUs 500 based on the speaker's voice command.

The voice recognition system 400 may include at least one memory in which a program for performing the above-described operations and operations to be described below is stored, and at least one processor for executing the stored program.

When the voice recognition system 400 includes a plurality of memories and a plurality of processors, the plurality of memories and the plurality of processors may be integrated into one chip or may be physically separated.

The plurality of ECUs 500 may perform at least one function related to electronics of the vehicle 1.

In one embodiment, the plurality of ECUs 500 may include a navigation device control unit, a window control unit, a ventilated seat control unit, a radio control unit, a sunroof control unit, a cruise function control unit, an air conditioner control unit, etc.

Based on receiving a control signal from the voice recognition system 400, the plurality of ECUs 500 may control the electronics of the vehicle 1 to perform an action corresponding to the control signal.

For instance, the air conditioner control unit may turn on an air conditioner, based on receiving a control signal for turning on the air conditioner from the voice recognition system 400.

According to embodiments, the microphone array 100, the sensor 200, the start button 300, the voice recognition system 400 and/or the plurality of ECUs 500 may perform communication through a vehicle communication network. For example, the voice recognition system 400 may transmit a control signal to the plurality of ECUs 500 through the vehicle communication network.

The vehicle communication network may use a communication method such as Ethernet, media oriented systems transport (MOST), FlexRay, controller area network (CAN), local interconnect network (LIN), and the like.

Figure 3:
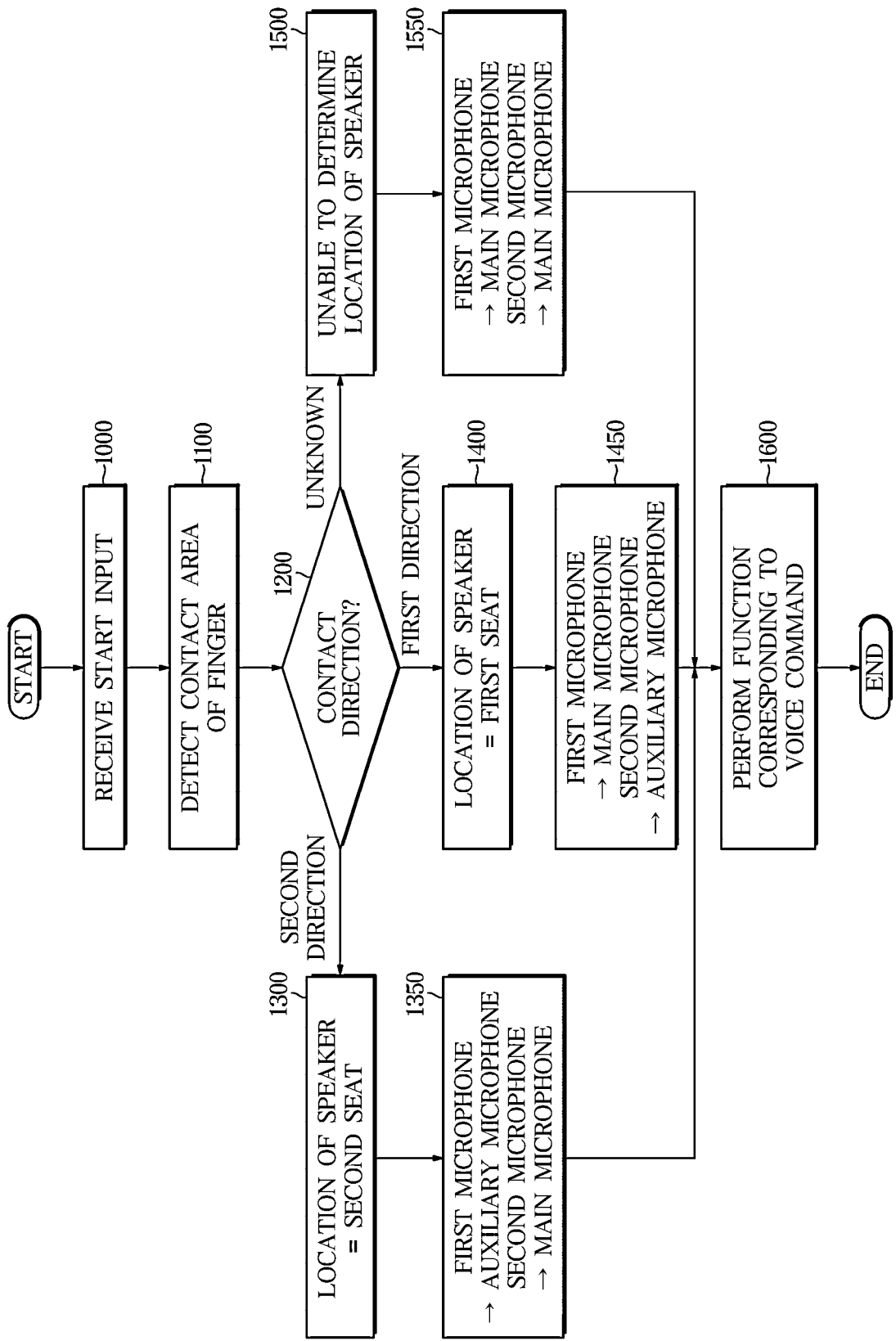
FIG. 3 is a flowchart illustrating a control method of a vehicle according to an embodiment.

FIG. 3 is a flowchart illustrating a control method of a vehicle according to an embodiment.

Referring to FIG. 3, an occupant (hereinafter, 'speaker') who desires to use a voice recognition function by pressing the start button 300 may press the start button 300 with the speaker's finger and the start button 300 may receive a start input (1000). For example, when the start button 300 is implemented as a push switch, the start input may refer to an electrical signal generated by pressing the push switch. When the start button 300 is implemented as a touchpad, the start input may refer to an electrical signal generated by touching the touchpad. In this specification, an act of pressing the start button 300 may include any act of making physical contact with the start button 300. For example, the act of pressing the start button 300 may include an act of touching the start button 300 as well as an act of pushing the start button 300 by applying a predetermined force.

The contact area sensor 210 may detect a contact area of the speaker's finger pressing the start button 300 (1100).

The voice recognition system 400 may be activated based on the start button 300 receiving the start input, and receive information about the contact area detected from the contact area sensor 210.

The voice recognition system 400 may determine a location of the speaker based on the finger's contact area.

For example, the voice recognition system 400 may determine whether the speaker is seated in the first seat LS or the second seat RS.

FIG. 4 illustrates a contact area when an occupant in a left seat presses a start button. FIG. 5 illustrates a contact area when an occupant in a right seat presses a start button.

Referring to FIG. 4, it is illustrated that a contact area "CA" when a first occupant sitting on the first seat LS presses the start button 300 located between the first seat LS and the second seat RS using the first occupant's finger.

Referring to FIG. 5, it is illustrated that a contact area CA when a second occupant sitting on the second seat RS presses the start button 300 located between the first seat LS and the second seat RS using the second occupant's finger.

The contact area CA may be detected in an elliptical shape, but a shape of the contact area CA may vary depending on a user's way of pressing.

The contact area CA may include a major axis "CD" and a minor axis "CW". The major axis may refer to the longest line segment when connecting two points on the contact area CA, and the minor axis CW may refer to the shortest line segment when connecting two points on the contact area CA.

A contact direction may be defined as a direction from a lowermost point "CDL" of the major axis CD toward an uppermost point "CDH" of the major axis CD. In this instance, an upper direction refers to a front of the vehicle 1, a left direction refers to a left side of the vehicle 1, a right direction refers to a right side of the vehicle 1, and a lower direction refers to a rear side of the vehicle 1.

In other words, the lowermost point CDL of the major axis CD refers to a point located at a lower side in two intersections between the major axis CD and an edge of the contact area CA. Also, the uppermost point CDH of the major axis CD refers to a point located at an upper side in two intersections between the major axis CD and the edge of the contact area CA.

As another example, a contact direction may be defined as a direction from an uppermost point CWH of the minor axis CW toward a lowermost point CWL of the minor axis CW.

Likewise, the lowermost point CWL of the minor axis CW refers to a point located at a lower side in two intersections between the minor axis CW and the edge of the contact area CA, and the uppermost point CWH of the minor axis CW refers to a point located at an upper side in two intersections between the minor axis CW and the edge of the contact area CA.

The voice recognition system 400 may determine the contact direction based on the contact area CA (1200).

For example, when connecting two points on the contact area CA, the voice recognition system 400 may determine the major axis CD which is the longest line segment, and determine a direction from the lowermost point CDL of the major axis CD toward the uppermost point CDH of the major axis CD as the finger's contact direction.

Based on the contact direction being determined as a first direction, the voice recognition system 400 may determine that the speaker is located in the first seat LS. In this instance, the first direction may refer to a direction tilted to the right with respect to a vertical axis.

In other words, the first direction may refer to a direction tilted to the right based on the front of the vehicle 1.

As another example, when connecting two points on the contact area CA, the voice recognition system 400 may determine the minor axis CW which is the shortest line segment, and determine a direction from the uppermost point CWH of the minor axis CW toward the lowermost point CWL of the minor axis CW as the contact direction.

As shown in FIG. 4, based on the contact direction being determined as the first direction, the voice recognition system 400 may determine that the speaker is located in the first seat LS (1400). In this instance, the first direction may refer to a direction tilted to the right based on the vertical axis.

In other words, the first direction may refer to a direction towards the second seat RS based on the front of the vehicle 1.

Even when the speaker sitting in the first seat LS presses the start button 300 from the right side by severely bending the speaker's wrist, the contact area CA shown in FIG. 4 is formed.

Specifically, when the speaker sitting in the first seat LS presses the start button 300 from the right side by bending the speaker's wrist, the start button 300 is in contact with the speaker's fingertip, and thus the contact direction of the contact area CA is toward the second seat RS, as shown in FIG. 4.

As illustrated in FIG. 5, based on the contact direction being determined as a second direction, the voice recognition system 400 may determine that the speaker is located in the second seat RS (1300). In this instance, the second direction may refer to a direction tilted to the left based on the vertical axis.

In other words, the second direction may refer to a direction towards the first seat LS based on the front of the vehicle 1.

Even when the speaker sitting in the second seat RS presses the start button 300 from the left side by severely bending the speaker's wrist, the contact area CA shown in FIG. 5 is formed.

Specifically, when the speaker sitting in the second seat RS presses the start button 300 from the left side by bending the speaker's wrist, the start button 300 is in contact with the speaker's fingertip, and thus the contact direction of the contact area CA is toward the first seat LS, as shown in FIG. 5.

When the voice recognition system 400 may not identify a major axis and minor axis based on the contact area CA or may not identify a contact direction, the voice recognition system 400 may not identify a location of the speaker based on the contact area CA (1500).

In one embodiment, a location of the speaker may be identified based on the finger's contact area with respect to the start button 300.

Based on a determination that the speaker is located in the first seat LS (1400), the voice recognition system 400 may select the first microphone 110 and the second microphone 120 as a main microphone and an auxiliary microphone, respectively (1450). In other words, when the speaker is located in the first seat LS, the voice recognition system 400 may use the first microphone 110 located adjacent to the first seat LS as the main microphone for collecting a voice signal of the speaker, and use the second microphone 120 located far from the speaker as the auxiliary microphone for collecting an ambient noise signal.

As such, when it is determined that the speaker is located in the first seat LS, the voice recognition system 400 may adjust a beamforming area of the microphone array 100 to the first seat LS.

By contrast, based on a determination that the speaker is located in the second seat RS (1300), the voice recognition system 400 may select the second microphone 120 and the first microphone 110 as the main microphone and the auxiliary microphone, respectively (1350). In other words, when the speaker is located in the second seat RS, the voice recognition system 400 may use the second microphone 120 located adjacent to the second seat RS as the main microphone for collecting a voice signal of the speaker, and use the first microphone 110 located far from the speaker as the auxiliary microphone for collecting an ambient noise signal.

As such, when it is determined that the speaker is located in the second seat RS, the voice recognition system 400 may adjust a beamforming area of the microphone array 100 to the second seat RS.

When one of the first microphone 110 or the second microphone 120 is used as the auxiliary microphone in a state where the location of the speaker is not identified, the voice signal of the speaker may not be collected clearly. In other words, recognizing an utterance of the speaker by processing a voice signal including a noise signal despite a low recognition rate is more advantageous than failing to recognize the utterance of the speaker by recognizing the voice signal of the speaker as the noise signal due to an erroneous determination of the location of the speaker.

Accordingly, based on the location of the speaker not being identified (1500), the voice recognition system 400 may select the first microphone 110 and the second microphone 120 as the main microphone (1550).

As described above, the voice recognition system 400 may select the first microphone 110 and the second microphone 120 as the main microphone or the auxiliary microphone, respectively, and remove a noise signal included in main audio data received from the main microphone based on auxiliary audio data received from the auxiliary microphone. Then, the voice recognition system 400 may identify a voice command of the speaker based on the main audio data from which the noise signal is removed.

The voice recognition system 400 may control the plurality of ECUs 500 to perform various functions of the vehicle 1 based on the voice command of the speaker (1600).

According to the disclosure, by identifying the location of the speaker who desires to use a voice recognition function and using a plurality of microphones included in the microphone array as the main microphone or the auxiliary microphone, respectively, the voice signal of the speaker may be collected more clearly.

However, when the location of the speaker is identified based only on the contact area CA, an accuracy of determining the location of the speaker may be reduced.

Accordingly, a method of determining the location of the speaker based on an output value of the weight sensor 220 and the contact area CA for the start button 300 is described with reference to FIGS. 6A and 6B.

Figure 6A:
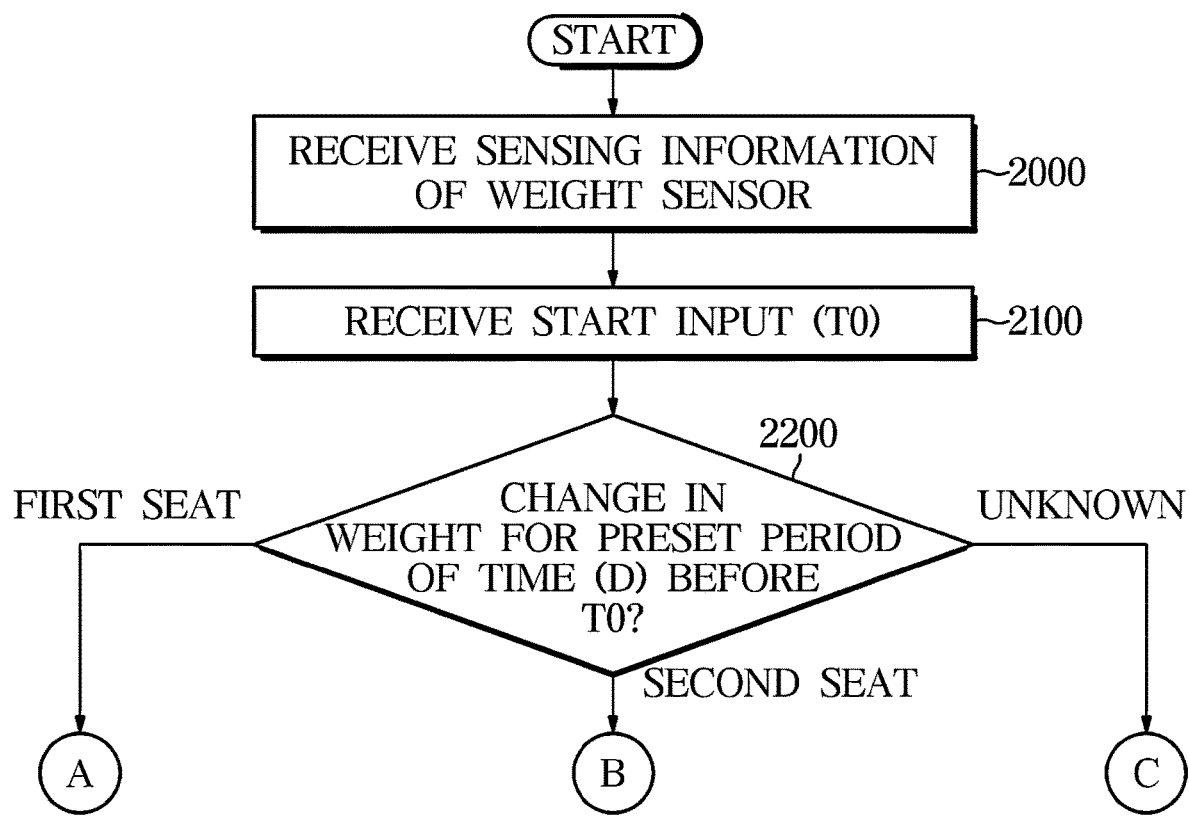
FIGS. 6A and 6B are a flowchart illustrating a control method of a vehicle according to another embodiment.
Figure 6B:
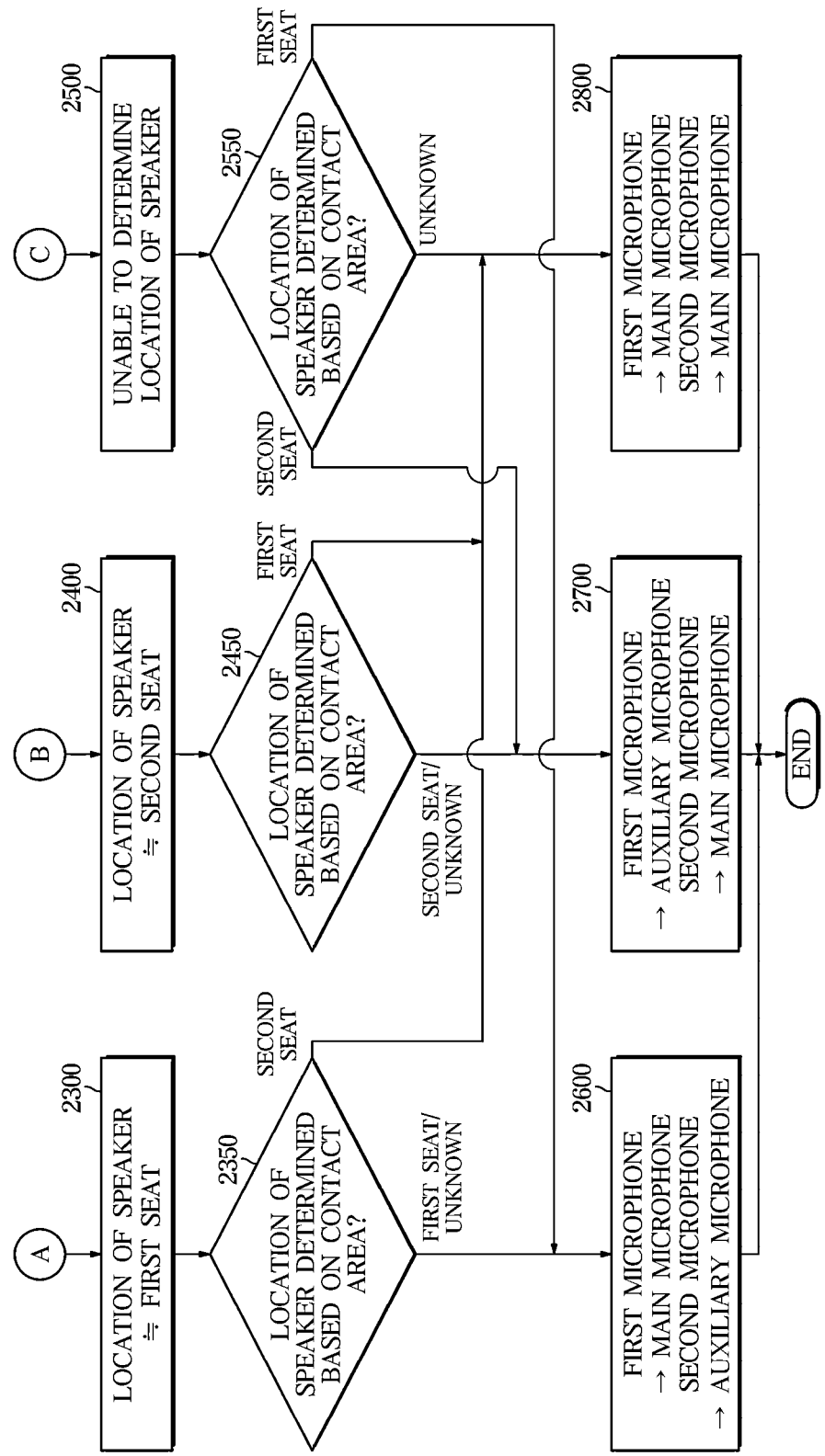

FIGS. 6A and 6B are a flowchart illustrating a control method of a vehicle according to another embodiment.

Referring to FIGS. 6A and 6B, the voice recognition system 400 may receive sensing information from the weight sensor 220 (2000).

As described above, the weight sensor 220 may include the first weight sensor 220L for detecting a first occupant and the second weight sensor 220R for detecting a second occupant.

Although not illustrated, when a weight is detected by the first weight sensor 220L but a weight is not detected by the second weight sensor 220R, the voice recognition system 400 may determine that a speaker is located in the first seat LS regardless of a contact area CA.

When a weight is detected by each of the first weight sensor 220L and the second weight sensor 220R, that is, both the first occupant and the second occupant are sitting in the vehicle 1, the voice recognition system 400 may estimate the location of the speaker based on a change in weight detected in the first weight sensor 220L and a change in weight detected in the second weight sensor 220R.

The first weight sensor 220L may obtain weight information of the first occupant in real time, and the second weight sensor 220R may obtain weight information of the second occupant in real time.

The weight information of the first occupant and the weight information of the second occupant may be temporarily stored in a memory of the voice recognition system 400.

Figure 7:
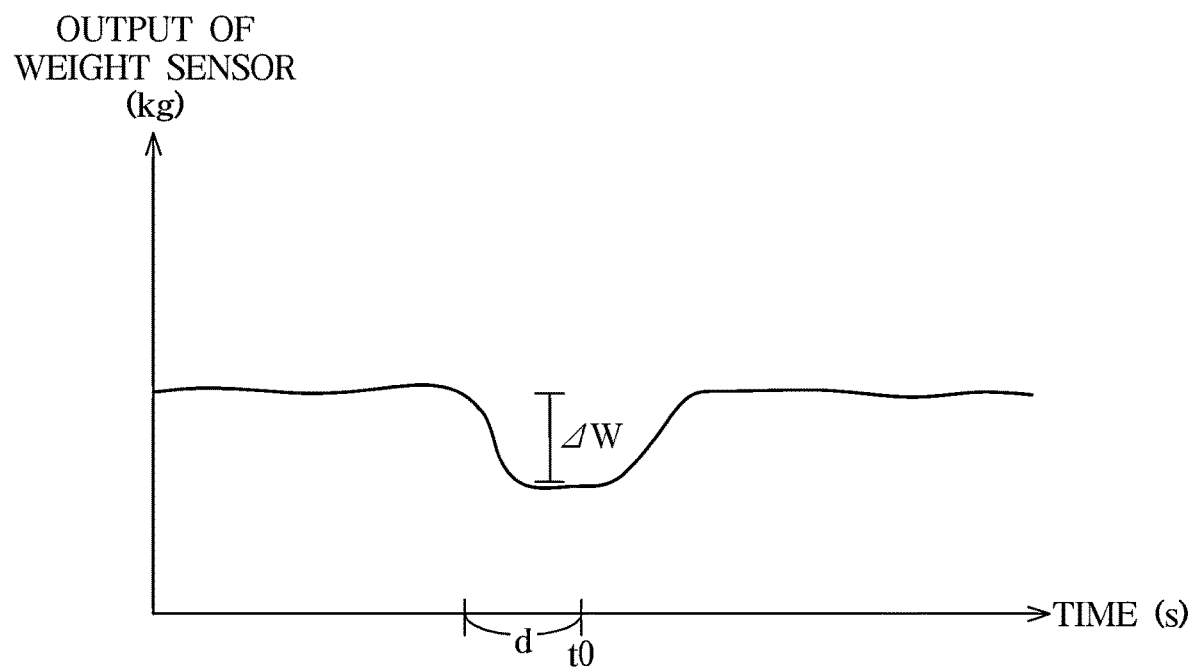
FIG. 7 illustrates an example of an output value of a weight sensor with time.

FIG. 7 illustrates an example of an output value of a weight sensor with time.

Referring to FIG. 7, a speaker may press the start button 300 with the speaker's finger at a point in time t0 and the start button 300 may receive a start input (2100).

The voice recognition system 400 may estimate a location of the speaker based on a weight of a first occupant and a weight of a second occupant for a preset period of time d before the point in time t0 that the start button 300 is pressed by the speaker (2200).

Because the speaker makes a movement or moves a center of mass of the speaker's body to press the start button 300, a weight detected by the weight sensor 220 may change.

The voice recognition system 400 may determine, as a seat where the speaker is seated, a seat corresponding to the weight sensor 220 (e.g., the first weight sensor 220L or the second weight sensor 220R) where the change in weight is detected for the preset period of time d before the point in time t0 that the start button 300 is pressed by the speaker.

In one embodiment, the voice recognition system 400 may estimate the location of the speaker as the first seat LS, when a history where the weight of the first occupant is changed by a preset value ($\Delta W$) for the preset period of time d before the point in time t0 that the start button 300 is pressed is existent and a history where the weight of the second occupant is changed by the preset value ($\Delta W$) for the preset period of time d before the point in time t0 that the start button 300 is pressed is non-existent (2300).

As another embodiment, the voice recognition system 400 may estimate the location of the speaker as the second seat RS, when the history where the weight of the first occupant is changed by the preset value ($\Delta W$) for the preset period of time d before the point in time t0 that the start button 300 is pressed is non-existent and the history where the weight of the second occupant is changed by the preset value ($\Delta W$) for the preset period of time d before the point in time t0 that the start button 300 is pressed is existent (2400).

Also, the voice recognition system 400 may not identify the location of the speaker, when the history where the weight of the first occupant is changed by the preset value ($\Delta W$) for the preset period of time d before the point in time t0 that the start button 300 is pressed is non-existent and the history where the weight of the second occupant is changed by the preset value ($\Delta W$) for the preset period of time d before the point in time t0 that the start button 300 is pressed is non-existent (2500).

The voice recognition system 400 may finally determine the location of the speaker, based on the location of the speaker estimated based on the contact area CA and the location of the speaker estimated based on the output value of the weight sensor 220.

A method of estimating the location of the speaker based on the contact area CA has been described above with reference to FIG. 3.

FIG. 8 illustrates a table for describing a criterion for identifying a location of a speaker according to a detection result of a contact area and a detection result of a weight change.

Hereinafter, for convenience of description, a mode where the voice recognition system 400 uses the first microphone 110 as a main microphone and the second microphone 120 as an auxiliary microphone is defined as a mode A, a mode where the voice recognition system 400 uses the second microphone 120 as the main microphone and the first microphone 110 as the auxiliary microphone is defined as a mode B, and a mode where the voice recognition system 400 uses the first microphone 110 and the second microphone 120 as the main microphone is defined as a mode C.

Referring to FIG. 8, the voice recognition system 400 may determine a location of a speaker, based on a location of the speaker estimated based on a contact area CA being identical to a location of the speaker estimated based on a weight of a first occupant and a weight of a second occupant.

In one embodiment, when the location of the speaker estimated based on the contact area CA is the first seat LS and the location of the speaker estimated based on the weight of the first occupant and the weight of the second occupant is the first seat LS, the voice recognition system 400 may determine the first seat LS as the location of the speaker.

As another embodiment, when the location of the speaker estimated based on the contact area CA is the second seat RS and the location of the speaker estimated based on the weight of the first occupant and the weight of the second occupant is the second seat RS, the voice recognition system 400 may determine the second seat RS as the location of the speaker.

In one embodiment, when the location of the speaker estimated based on the contact area CA is different form the location of the speaker estimated based on the weight of the first occupant and the weight of the second occupant, the voice recognition system 400 may not identify the location of the speaker.

In other embodiment, when the location of the speaker estimated based on the contact area CA is the first seat LS and the location of the speaker estimated based on the weight of the first occupant and the weight of the second occupant is the second seat RS, the voice recognition system 400 may not determine the location of the speaker.

As another embodiment, when the location of the speaker estimated based on the contact area CA is the second seat RS and the location of the speaker estimated based on the weight of the first occupant and the weight of the second occupant is the first seat LS, the voice recognition system 400 may not determine the location of the speaker.

In another form, when the location of the speaker is estimated based on the contact area CA, but may not be estimated based on the weight of the first occupant and the weight of the second occupant, the voice recognition system 400 may determine the location of the speaker estimated based on the contact area CA, as the location of the speaker.

In addition, when the location of the speaker may not be estimated based on the contact area CA, but is estimated based on the weight of the first occupant and the weight of the second occupant, the voice recognition system 400 may determine the location of the speaker estimated based on the weight of the first occupant and the weight of the second occupant, as the location of the speaker.

For example, when the location of the speaker estimated based on the contact area CA is the first seat LS or the second seat RS, but the location of the speaker may not be estimated based on the weight of the first occupant and the weight of the second occupant, the voice recognition system 400 may determine the location of the speaker as the first seat LS or the second seat RS.

As another embodiment, when the location of the speaker may not be estimated based on the contact area CA, but the location of the speaker estimated based on the weight of the first occupant and the weight of the second occupant is the first seat LS or the second seat RS, the voice recognition system 400 may determine the location of the speaker as the first seat LS or the second seat RS.

Based on the location of the speaker being determined as the first seat LS, the voice recognition system 400 may be operated in the mode A. Also, based on the location of the speaker being determined as the second seat RS, the voice recognition system 400 may be operated in the mode B. Further, based on the location of the speaker not being identified, the voice recognition system 400 may be operated in the mode C.

According to an embodiment, when the location of the speaker estimated based on the weight of the first occupant and the weight of the second occupant is the first seat LS and the location of the speaker estimated based on the contact area CA is the first seat LS ('first seat' in operation 2350), the voice recognition system 400 may be operated in the mode A (2600).

Also, when the location of the speaker estimated based on the weight of the first occupant and the weight of the second occupant is the first seat LS and the location of the speaker may not be estimated based on the contact area CA ('unknown' in operation 2350), the voice recognition system 400 may be operated in the mode A (2600).

In addition, when the location of the speaker may not be estimated based on the weight of the first occupant and the weight of the second occupant and the location of the speaker estimated based on the contact area CA is the first seat LS ('first seat' in operation 2550), the voice recognition system 400 may be operated in the mode A (2600).

According to an embodiment, when the location of the speaker estimated based on the weight of the first occupant and the weight of the second occupant is the second seat RS and the location of the speaker estimated based on the contact area CA is the second seat RS ('second seat' in operation 2450), the voice recognition system 400 may be operated in the mode B (2700).

Also, when the location of the speaker estimated based on the weight of the first occupant and the weight of the second occupant is the second seat RS and the location of the speaker may not be estimated based on the contact area CA ('unknown' in operation 2450), the voice recognition system 400 may be operated in the mode B (2700).

In addition, when the location of the speaker may not be estimated based on the weight of the first occupant and the weight of the second occupant and the location of the speaker estimated based on the contact area CA is the second seat RS ('second seat' in operation 2550), the voice recognition system 400 may be operated in the mode B (2700).

According to an embodiment, when the location of the speaker estimated based on the weight of the first occupant and the weight of the second occupant is the first seat LS and the location of the speaker estimated based on the contact area CA is the second seat RS ('second seat' in operation 2350), the voice recognition system 400 may be operated in the mode C (2800).

Also, when the location of the speaker estimated based on the weight of the first occupant and the weight of the second occupant is the second seat RS and the location of the speaker estimated based on the contact area CA is the first seat LS ('first seat' in operation 2450), the voice recognition system 400 may be operated in the mode C (2800).

In addition, when the location of the speaker may not be estimated based on the weight of the first occupant and the weight of the second occupant and the location of the speaker may not be estimated based on the contact area CA ('unknown' in operation 2550), the voice recognition system 400 may be operated in the mode C (2800).

According to one embodiment of the disclosure, by using both the contact area sensor and the weight sensor in determining a location of a speaker, an accuracy of determining the location of the speaker can be improved.

Also, according to the disclosure, a voice recognition rate can be improved by accurately determining a location of a speaker.

Also, according to one embodiment of the disclosure, a high-performance voice recognition can be provided to a user by installing a low-cost sensor in a start button instead of mounting a high-priced hardware (e.g., a microphone).

Also, according to one embodiment of the disclosure, even the vehicle 1 without a weight sensor installed in a rear seat can determine a location of a speaker based on a low-cost sensor.

Also, according to the disclosure, when a location of a speaker is not identified accurately, by using all microphones included in a microphone array as a main microphone, inability to recognize voice may be prevented.

As is apparent from the above, according to the disclosure, the vehicle and the control method thereof can identify a speaker who desires to use a voice recognition function and accurately recognize a voice command of the speaker, thereby improving a usability of a voice recognition system.

According to the disclosure, the vehicle and the control method thereof can improve a performance of voice recognition using the limited number of microphones.

According to the disclosure, the vehicle and the control method thereof can prevent a rise in manufacturing cost of vehicle due to an increase in the number of microphones.

Although embodiments have been described for illustrative purposes, those having ordinary skill in the art should appreciate that various modifications, additions and substitutions are possible, without departing from the scope and spirit of the disclosure. Therefore, embodiments have not been described for limiting purposes.

Embodiments can thus be implemented through computer readable code/instructions in/on a medium, e.g., a computer readable medium, to control at least one processing element to implement any above described embodiment. The medium can correspond to any medium/media permitting the storing and/or transmission of the computer readable code.

The computer-readable code can be recorded on a medium or transmitted through the Internet. The medium may include read only memory (ROM), random access memory (RAM), magnetic tapes, magnetic disks, flash memories, and optical recording medium.

What is claimed is:

1. A vehicle, comprising:
a microphone array comprising a first microphone and a second microphone;
a voice recognition system configured to be activated by a button disposed between the first microphone and the second microphone;
a contact area sensor configured to detect a contact area of a finger that is generated on the contact area sensor when the finger presses the button;
a first weight sensor configured to detect a weight of a first occupant sitting in a first seat; and
a second weight sensor configured to detect a weight of a second occupant sitting in a second seat,
wherein the voice recognition system is configured to:
estimate a location of a speaker based on the contact area,
estimate a location of the speaker based on the weight of the first occupant and the weight of the second occupant,
determine the location of the speaker based on the location of the speaker estimated based on the contact area being identical to the location of the speaker estimated based on the weight of the first occupant and the weight of the second occupant,
select the first microphone as a main microphone and the second microphone as an auxiliary microphone when the speaker is located in the first seat based on the determined location of the speaker, and
select the second microphone as the main microphone and the first microphone as the auxiliary microphone when the speaker is located in the second seat based on the determined location of the speaker.

2. The vehicle of claim 1, wherein the voice recognition system is configured to:
receive main audio data from the main microphone,
receive auxiliary audio data from the auxiliary microphone,
remove a noise signal included in the main audio data based on the auxiliary audio data, and
identify a voice command of the speaker based on the main audio data from which the noise signal is removed.

3. The vehicle of claim 1, wherein:
a distance between the first microphone and the first seat is shorter than a distance between the second microphone and the first seat, and
a distance between the second microphone and the second seat is shorter than a distance between the first microphone and the second seat.

4. The vehicle of claim 1, wherein the voice recognition system is configured to:
determine a contact direction of the finger based on the contact area,
determine that the speaker is located in the first seat when the contact direction is a first direction, and
determine that the speaker is located in the second seat when the contact direction is a second direction.

5. The vehicle of claim 4, wherein the first direction is toward the second seat, and the second direction is toward the first seat.

6. The vehicle of claim 1, wherein the voice recognition system is configured to select the first microphone and the second microphone as the main microphone when the location of the speaker is not determined.

7. The vehicle of claim 1, wherein the voice recognition system is configured to determine the location of the speaker as the first seat, based on a history where the weight of the first occupant is changed by a preset value for a preset period of time before the button is pressed being existent and a history where the weight of the second occupant is changed by the preset value for the preset period of time before the button is pressed being non-existent.

8. The vehicle of claim 1, wherein the voice recognition system is configured to determine, as the location of the speaker, the location of the speaker estimated based on the contact area, when a history where the weight of the first occupant and the weight of the second occupant are changed by a preset value for a preset period of time before the button is pressed is non-existent.

9. The vehicle of claim 1, wherein the voice recognition system is configured to determine the first microphone and the second microphone as the main microphone, based on the location of the speaker estimated based on the contact area being different from the location of the speaker estimated based on the weight of the first occupant and the weight of the second occupant.

10. A control method of a vehicle comprising a microphone array comprising a first microphone and a second microphone, a button to activate a voice recognition system, a contact area sensor to detect a contact area of a finger pressing the button, a first weight sensor configured to detect a weight of a first occupant sitting in a first seat, and a second weight sensor configured to detect a weight of a second occupant sitting in a second seat, the control method comprising:
determining the contact area generated on the contact area sensor in response that the finger presses the button;
determining a location of a speaker based on the contact area generated on the contact area sensor,
selecting the first microphone and the second microphone as a main microphone and an auxiliary microphone, respectively, based on a determination that the speaker is located in the first seat based on the determined location of the speaker, and
selecting the second microphone and the first microphone as the main microphone and the auxiliary microphone, respectively, based on a determination that the speaker is located in the second seat based on the determined location of the speaker, wherein determining the location of the speaker comprises:
- estimating a location of the speaker based on the contact area;
- estimating a location of the speaker based on a weight of a first occupant sitting in the first seat and a weight of a second occupant sitting in the second seat; and
- determining the location of the speaker based on the location of the speaker estimated based on the contact area being identical to the location of the speaker estimated based on the weight of the first occupant and the weight of the second occupant.

11. The control method of claim 10, further comprising:
receiving main audio data from the main microphone;
receiving auxiliary audio data from the auxiliary microphone;
removing a noise signal included in the main audio data based on the auxiliary audio data; and
identifying a voice command of the speaker based on the main audio data from which the noise signal is removed.

12. The control method of claim 10, wherein a distance between the first microphone and the first seat is shorter than a distance between the second microphone and the first seat, and a distance between the second microphone and the second seat is shorter than a distance between the first microphone and the second seat.

13. The control method of claim 10, wherein determining the location of the speaker comprises:
determining a contact direction of the finger based on the contact area;
determining that the speaker is located in the first seat based on a determination that the contact direction is a first direction; and
determining that the speaker is located in the second seat based on a determination that the contact direction is a second direction.

14. The control method of claim 13, wherein the first direction is toward the second seat, and the second direction is toward the first seat.

15. The control method of claim 10, further comprising:
selecting the first microphone and the second microphone as the main microphone based on the location of the speaker not being determined.

16. The control method of claim 10, wherein estimating the location of the speaker based on the weight of the first occupant and the weight of the second occupant comprises: determining the location of the speaker as the first seat based on a history where the weight of the first occupant is changed by a preset value for a preset period of time before the button is pressed being existent and a history where the weight of the second occupant is changed by the preset value for the preset period of time before the button is pressed being non-existent.

17. The control method of claim 10, wherein determining the location of the speaker comprises: determining, as the location of the speaker, the location of the speaker estimated based on the contact area when a history where the weight of the first occupant and the weight of the second occupant are changed by a preset value for a preset period of time before the button is pressed is non-existent.

18. The control method of claim 10, further comprising:
determining the first microphone and the second microphone as the main microphone based on the location of the speaker estimated based on the contact area being different from the location of the speaker estimated based on the weight of the first occupant and the weight of the second occupant.

* * * * *